(12) United States Patent
de Dood et al.

(10) Patent No.: US 7,107,551 B1
(45) Date of Patent: Sep. 12, 2006

(54) OPTIMIZATION OF CIRCUIT DESIGNS USING A CONTINUOUS SPECTRUM OF LIBRARY CELLS

(75) Inventors: Paul de Dood, Pleasanton, CA (US); Brian Lee, Cupertino, CA (US); Daniel Albers, Beaver, PA (US)

(73) Assignee: Prolific, Inc., Newark, CA (US)

( * ) Notice: Subject to any disclaimer, the term of this patent is extended or adjusted under 35 U.S.C. 154(b) by 3 days.

(21) Appl. No.: 10/447,396

(22) Filed: May 30, 2003

(51) Int. Cl.
   *G06F 17/50* (2006.01)
(52) U.S. Cl. ............................................. 716/2; 716/5
(58) Field of Classification Search .................... 716/1, 716/2–6
   See application file for complete search history.

(56) References Cited

U.S. PATENT DOCUMENTS

| | | | |
|---|---|---|---|
| 5,426,591 A | 6/1995 | Ginetti et al. | |
| 5,459,673 A | 10/1995 | Carmean et al. | |
| 5,563,800 A * | 10/1996 | Matsumoto et al. | 716/3 |
| 5,633,805 A | 5/1997 | Simonsen | |
| 5,724,250 A | 3/1998 | Kerzman et al. | |
| 5,764,531 A | 6/1998 | Kojima et al. | |
| 5,764,533 A | 6/1998 | de Dood | |
| 6,367,056 B1 * | 4/2002 | Lee | 716/5 |
| 6,453,446 B1 | 9/2002 | van Ginneken | |
| 6,467,074 B1 * | 10/2002 | Katsioulas et al. | 716/17 |
| 6,490,708 B1 * | 12/2002 | Cohn et al. | 716/4 |
| 6,496,965 B1 | 12/2002 | va Ginneken et al. | |
| 6,543,036 B1 * | 4/2003 | Iyer et al. | 716/6 |
| 2003/0009318 A1 * | 1/2003 | Amatangelo et al. | 703/19 |
| 2003/0023938 A1 * | 1/2003 | Nagasaka et al. | 716/2 |

OTHER PUBLICATIONS

Conn, A., et al. "Gradient-Based Optimization of Custom Circuits Using a Static-Timing Forumulation," *Proceedings of DAC99*, Jun. 1999, New Orleans, Louisiana.

Sapatnekar, S., et al. "An Exact Solution to the Transistor Sizing Problem for CMOS Circuits Using Convex Optimization," *IEEE Transactions on Computer-Aided Design of Integrated Circuits and Systems*, vol. 12, No. 11, Nov. 1993.

Northrop, G., and Lu, P., "A Semi-custom Design Flow in High-performance Microprocessor Design," *Proceedings of DAC 2001*, Jun. 18-22 2001, Las Vegas, Nevada.

Chinnery, D., et al. "Achieving 550 MHz in an ASIC Methodology," *Proceedings of DAC 2001*, Jun. 18-22, 2001, Las Vegas, Nevada.

Chinnery, D., and Keutzer, K., "Closing the Gap Between ASIC and Custom: An ASIC Perspective," *Proceedings of DAC 2000*, Jun. 2000, Los Angeles, California.

(Continued)

*Primary Examiner*—Vuthe Siek
(74) *Attorney, Agent, or Firm*—O'Melveny & Myers LLP

(57) ABSTRACT

A method and apparatus for optimizing a circuit design using a library of cells in which a continuous spectrum of cells are provided. A library containing real and virtual cells is used so that cells can be selected across a wide spectrum of a design parameter, such as drive strength. The cells are provided in discrete steps small enough that the effect of having a continuous spectrum of cells is achieved. After optimization, only the cells finally selected need be actually synthesized, and when these constitute a small percentage of the total number of cells, the impact to library size and final placement and routing is minimized. Thus the ability to optimize across a continuous spectrum is achieved while preserving a cell library based design flow.

38 Claims, 9 Drawing Sheets

OTHER PUBLICATIONS

Conn, A., Coulman, et al. "JiffyTune: Circuit Optimization Using Time-Domain Sensitivities," *IEEE Transactions on Computer-Aided Design of Integrated Circuits and Systems*, vol. 17, No. 12, Dec. 1998.

Visweswariah, C., and Conn, A., "Formulation of Static Circuit Optimization with Reduced Size, Degeneracy and Redundancy by Timing Graph Manipulation," *Proceedings of International Conference on Computer-Aided Design*, Nov. 7-11, 1999, San Jose, CA.

*White Paper*, Prolific, Inc., 2001.

R. Haddad, L.P.P.P. van Ginneken, N. Shenoy, "Discrete Drive Selection for Continuous Sizing," Proceedings of the 1997 International Conference on Computer Design (ICCD '97), pp. 110-115.

* cited by examiner

OPTIMIZATION OF CIRCUIT DESIGNS USING A CONTINUOUS SPECTRUM OF LIBRARY CELLS

FIELD OF THE INVENTION

The invention relates to the field of semiconductor design tools, and more particularly to tools that optimize the performance of circuit designs.

BACKGROUND OF THE INVENTION

The design and optimization of an integrated circuit follows a design flow that utilizes a multi-level hierarchy of circuit specifications. At the highest level is the functional or architectural specification of the circuit. At the lowest level are placed transistors that can be used to generate masks for fabrication. Today, design flows are often based on standard cells, in which a library of low level circuits are generated, manually or automatically, and the design process selects cells from the library that match the circuit specifications.

In a typical design flow, referred to as a synthesis and place-and-route (or SPR) flow, a fixed set of cells—called a library—is used to map a given design into a physical implementation. The number of cells, and the amount of optimization that can be performed, is limited. This approach is less efficient than arbitrary full-custom design. Limitations on fixed or static libraries have been necessary because SPR tools do not efficiently automate design at the transistor level. As a result, cell generation has not been included in the EDA design flow and has been largely done by hand. Furthermore, with the advent of third-party library companies, library creation is often out-sourced.

One reason that SPR flows result in sub-optimal designs is due to limitations on the size of the cell libraries, and on the optimization process itself. Typically, logically equivalent cells in a library are provided according to a binary scale of drive strength. For example, 1×, 2×, 4×, 8× and 16× drive strength NAND gate cells are provided in a cell library. The optimization process can then only select one of these five drive strengths of logically equivalent cells to optimize a circuit.

The process of creating a large number of cells scaled to different drive strengths can be automated. However, this merely creates an oversize cell library that cannot be utilized effectively by current design tools. Most current design tools assume there will be only approximately five electrical variations for each logical function, and assume binary scaling of cells. Furthermore, a large amount of time would be needed to synthesize each scaled cell, and the size of the libraries themselves would get cumbersome. Finally, simply optimizing a design across a large number of possible cells may result in an unnecessarily large number of minor variations, many of which do not affect the overall performance.

SUMMARY OF THE INVENTION

The present invention is a method and apparatus for optimizing a circuit design using cells that vary across a relatively continuous spectrum of design parameters such as drive strength, while retaining the ability to work in an SPR design flow with standard tools with minimum impact to the overall design flow. The performance of the circuit design is evaluated, and iterative cell replacements are made from the set of cells provided until a termination condition is met. The cells may vary across a spectrum of drive strength and/or other electrical parameters, such as P/N ratio or taper factor. The cells may be provided in real and virtual libraries, such that the virtual cells have timing information associated with them, but have not been built. The decision on whether to replace a cell or not may be based on whether the worst case delay through the circuit improves. In some cases certain cells are replaced by cells with minimum area or power prior to the main iteration loop.

The order in which cells are selected as candidates for replacement can be based on evaluating the worst case path, computing the area to transition time ratio for each cell in that path, and starting with the smallest and slowest cells first. The optimization process can also include marking a cell as stable when no improvement can be found and not re-testing a cell marked as stable. In this embodiment, a cell is unmarked as stable when its context changes; that is, when an adjacent cell is replaced.

The invention will be better understood with reference to the drawings and detailed description below.

SUMMARY OF THE FIGURES

The present invention will be described with reference to the drawings, in which.

DETAILED DESCRIPTION

The present invention is directed to a method and apparatus that improves the performance of a circuit design. The present invention is preferably directed at a SPR design flow, although it could be applied to other design flows. Cell instances on a critical path are iteratively replaced with functionally equivalent cells having varied characteristics such as drive strength. The process repeats until the desired performance target of the design is reached or until no more improvements can be made. In one embodiment, critical paths are improved by slowly increasing the drive strength of cells on the critical path. When no more improvements can be found, a mechanism is employed to establish if the current design is at a local minimum or a global minimum. First, a slight timing tolerance is applied for a certain number of iterations. This represents a hill climbing technique to accommodate minor variations in the results of static timing analysis. Second, each cell on the critical path is tested with all of the logical equivalents to that cell to determine if an improvement can be found. This has the effect of switching to other electrical variations, such as a new P/N ratio, a new taper factor, a cell with one or more fast inputs, or one or more low threshold (fast) transistors. If a different electrical variant improves performance, then the cell replacement is made and scaling will again attempt to find a better cell.

The cell library contains real and virtual cells chosen so that a design parameter, such as drive strength, varies in small discrete steps. Drive strength can in principle vary continuously along an entire spectrum. The optimum choice of drive strength depends on the context of the cell, including the load of the cell and the drive strength of the previous cell. Higher drive strengths drive their load faster, but they load and slow down the cells that drive them, and use more power. Having a very limited set of choices of drive strength produces a design that has longer cycle times, uses more power, and has more area than a fully optimized design. Note that other design parameters besides drive strength are possible, since each transistor or group of transistors is scaled independently. For example, cells can be provided with different P/N ratios or different taper factors.

For these reasons, the steps of the cell library are chosen such that a relatively continuous spectrum of values across the design parameter is achieved. A "relatively continuous" spectrum means that the spectrum is more continuous than binary scaling: the goal is to come close to the effect of a continuous spectrum, while achieving optimization times and library sizes that are practical; the step sizes need not be smaller than static timing analysis is able to effectively distinguish; the step sizes also need not be smaller than is necessary to create a meaningful change in timing of the circuit.

Figure 1:
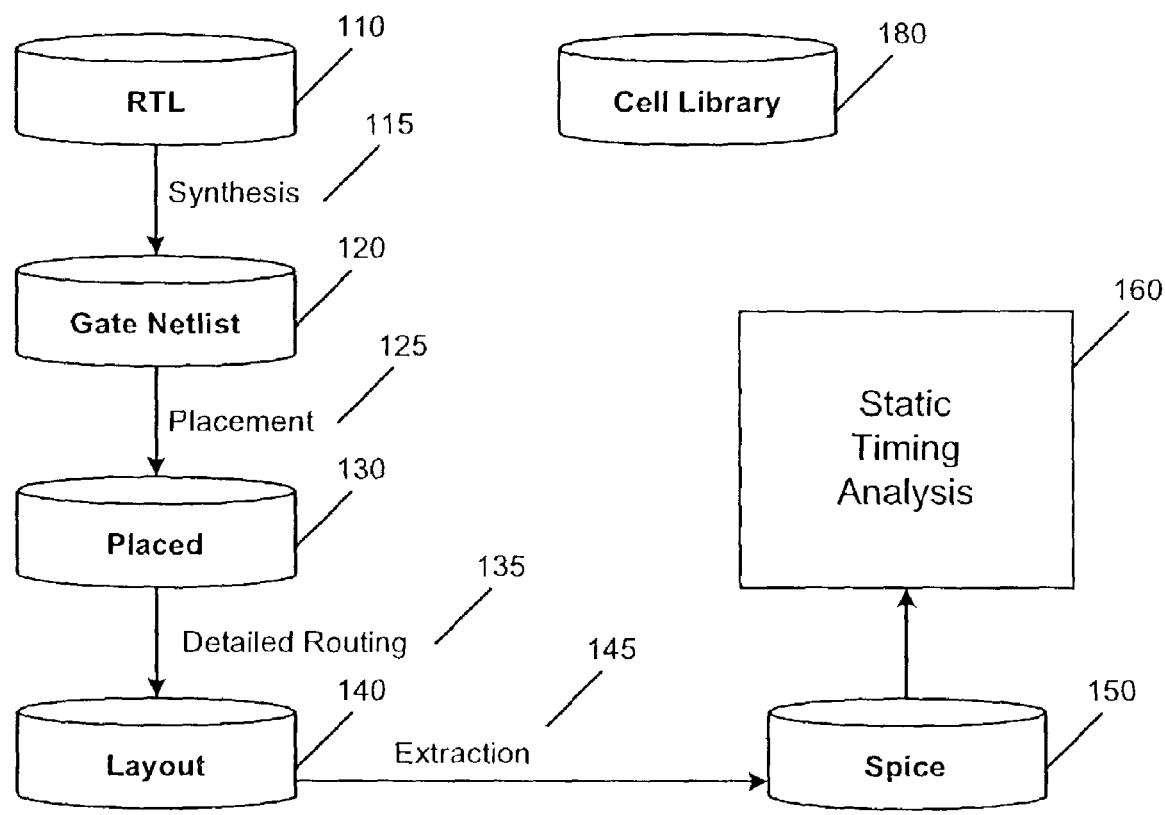
FIG. 1 illustrates a portion of a prior art design flow.
Figure 2A:
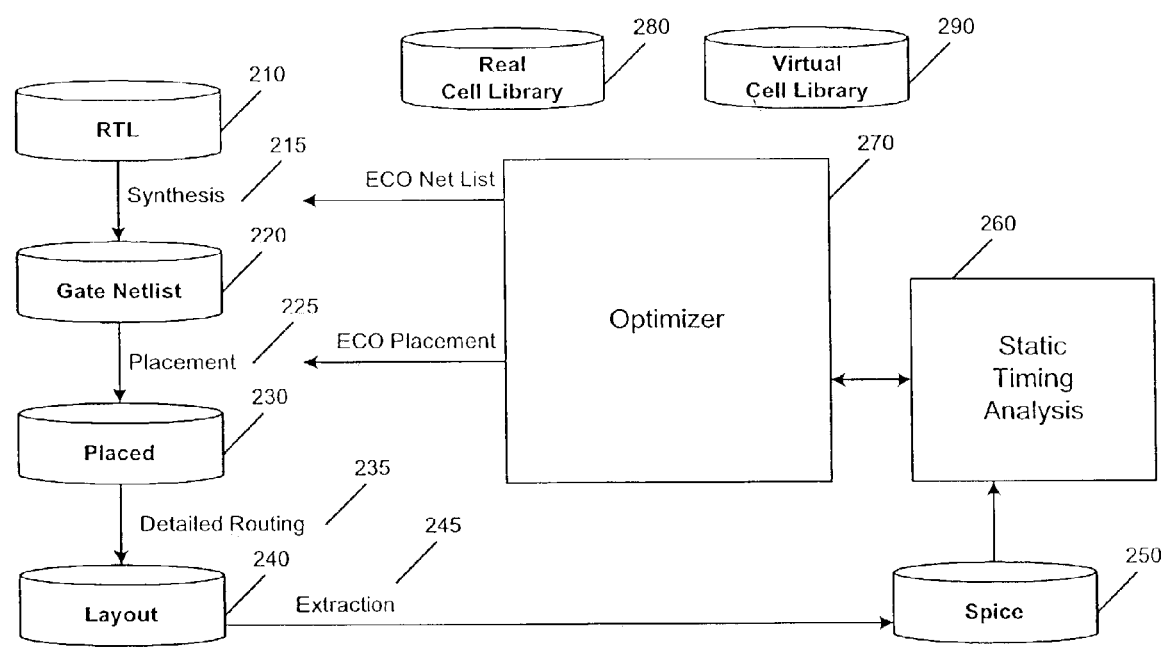
FIG. 2A illustrates a portion of a design flow incorporating an embodiment of the present invention.
Figure 2B:
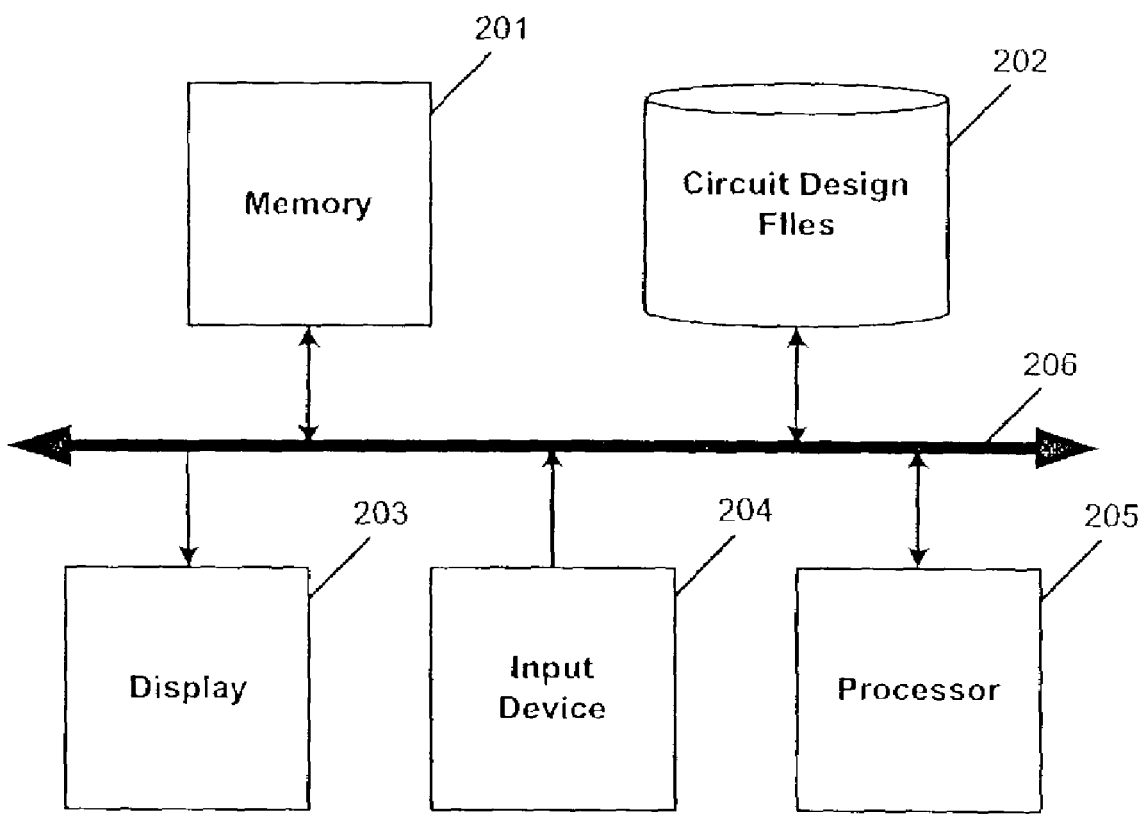
FIG. 2B illustrates an embodiment of a computer system for use with the present invention.

FIG. 1 illustrates a prior art design flow. The specification of a circuit exists at multiple levels. RTL 110 is the specification of a circuit design at the register transfer level. It can be written by hand, or can be generated by other design tools. A synthesis tool 115 is a program that is used to convert the RTL specification of a circuit into a gate netlist 120. Another program, the placement tool 125 is used to convert a gate netlist representation of a circuit design into placed gates 130. Finally a detailed routing program 135 is used to generate an exact layout 140 of the circuit design. After a layout has been generated, timing analysis consists of running an extraction program 145 to extract a Spice 150 representation of the design. Then, static timing analysis tool 160 is used to generate timing results for the circuit. One or more steps in the standard flow may be combined into a single software package. One example of a static timing analysis tool is the tool sold by Synopsys, Inc, under the trademark PrimeTime. Once timing results are produced, hand-optimization is used to change circuit specifications at the RTL level. Optimizations at other levels are difficult and time consuming to incorporate FIG. 2 illustrates a design flow incorporating an embodiment of the present invention. Blocks 210, 215, 220, 225, 230, 235, 240, 245, 250, 260 and 280 operate in much the same fashion as the analogous blocks in FIG. 1. Optimizer 270 interacts with static timing analysis program 260 to iteratively analyze the circuit design after cell replacements have been made. The timing is optimized utilizing cells in both the real and virtual libraries until a timing goal is reached or there are no further improvements to be made. Cells are replaced only with logically equivalent cells, so the functionality of the design is not changed. After optimizer 270 finishes the process, results can be exported in the form of engineering change order (or ECO) files to be processed by synthesis tool 215 and placement tool 225. The changes can then be incorporated into the standard design flow. In this way, the use of a standard design flow can be employed. A useful feature of static timing analysis 260 is the ability to perform incremental timing analysis. This means that if the design is changed with only a single cell replacement, it is not necessary to re-analyze the entire circuit, but only the portions that can be affected by the change.

Figure 3:
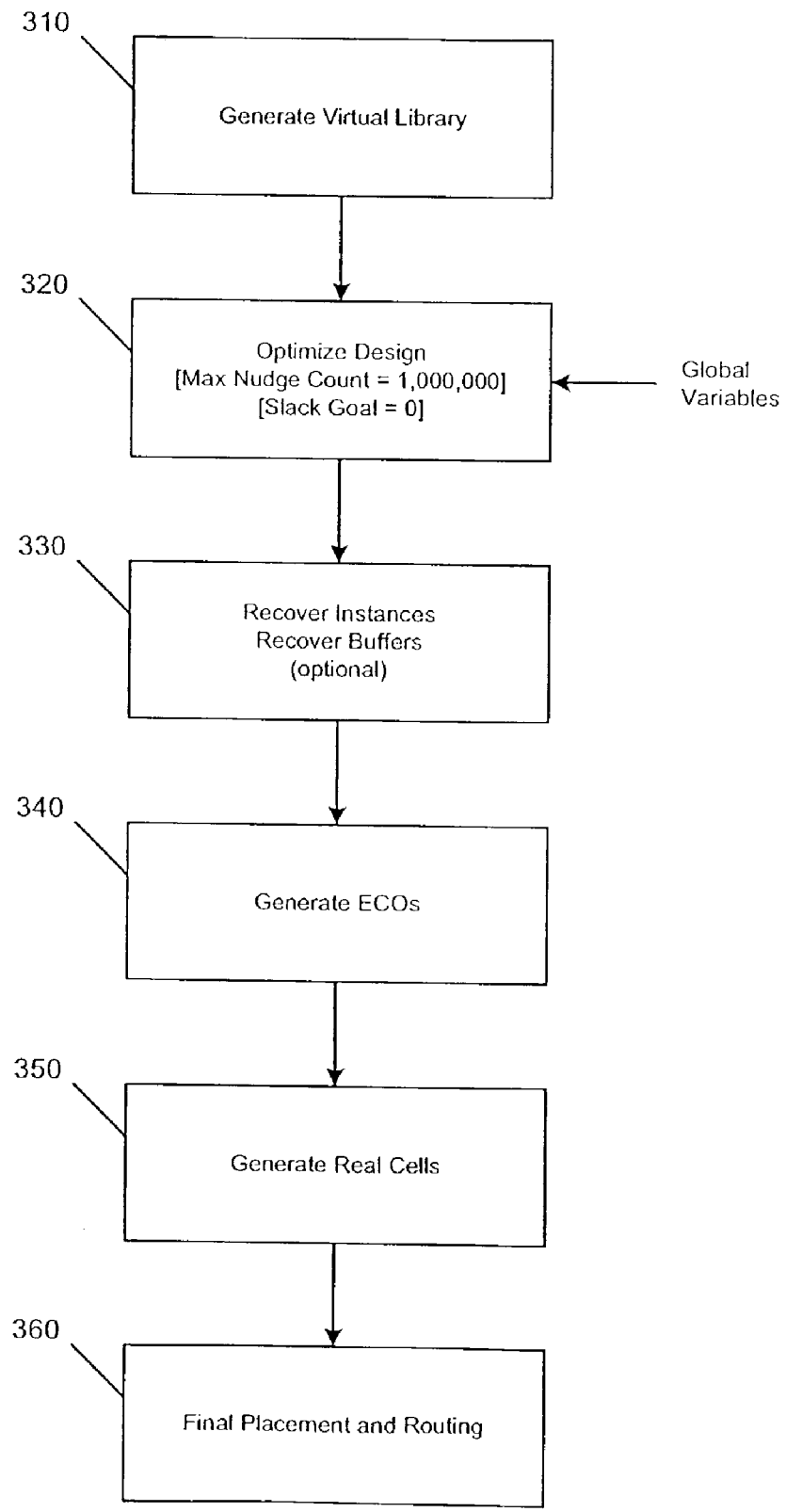
FIG. 3 illustrates a flow chart of an embodiment of the present invention.

FIG. 3 illustrates a flow chart of an embodiment of the present invention. In step 310, virtual library 290 is created. This step involves the generation of cells scaled in small, discrete steps logically equivalent to cells in the real library. Cells in the virtual library are characterized sufficiently for a static timing analysis, but they are not built. Thus, the size of the virtual library, and the time needed to generate it, are small compared to a real library with the same cells. The sizes of the discrete scaling steps is chosen such that the effect of a continuous spectrum of scaling is achieved. In one embodiment, this involves scaling in 20% steps up to 300% and scaling in 25% steps from 300% up to 600%. Alternatively the virtual library may utilize scaling in 10% steps. Each of these embodiments provide finer granularity than the binary scaling of a real cell library.

The generation of the virtual library involves generating timing behavior for a specified set of cells based on the timing characteristics in a real library. These timing characteristics can be generated by scaling, by interpolation, or some combination of the two. The timing characteristics of the real cells is typically represented by a table, in which the delay through the cell and the output transition time are specified for a set of input transition times and output capacitances. Table entries are of the form: $(\text{slew}_a, C_b): T_{ab}$ and $(\text{slew}_c, C_d): S_{cd}$ where $\text{slew}_a$ and $\text{slew}_c$ are input transition times, $C_b$ and $C_d$ are output capacitances, $T_{ab}$ is the delay through the cell under the conditions specified by $\text{slew}_a$ and $C_b$, and $S_{cd}$ is the output transition time of the cell under the conditions specified by $\text{slew}_c$ and $C_d$. A set of table entries specify the timing characteristics of the cell. Other input variables besides input transition time and output capacitance are possible, and other output variable besides delay and output transition time are possible. During static timing analysis, the actual input transition time and output capacitance of a real or virtual cell within the circuit design are used to compute the delay and output transition time of that cell by interpolating the values in the table entries corresponding to that cell. An alternative method of specifying timing characteristics is to use an equation where each cell is specified in terms of polynomial coefficients. This method allows static timing analysis to use a calculated value rather than a value interpolated from a table. More generally, generating the timing for a given instance of a cell, given the adjacent connections of the cell, is an input/output function where the characteristics of a cell are generated by using the timing characteristics of the adjacent cells.

When a virtual library is built, the cells themselves are not actually generated at the transistor level. However, the timing characteristics need to be generated so that static timing analysis can take place. This means that in the case of a table-based timing specification, a new table must be created for each scaled cell. The basic technique is that scaling a cell by a scale factor of S assumes that the input capacitance scales by S and that the output capacitance corresponding to a given timing characteristic also scales by S. This means that the scaled cell can drive a higher output capacitance in the same time as the unscaled cell and has a scaled input capacitance. This can be done by multiplying each output capacitance in each table entry by S, and by multiplying the input capacitance by S. When a scaled cell is actually built, every transistor width is multiplied by the scale factor.

Another way to create a new table for a cell in a virtual library is to interpolate two or more cells. In general when interpolating two or more cells, each cell has its own scale factor and the resulting cell is the combination of such scaled cells. Simple interpolation, in which the sum of the scale factors equals one is a special case of the more general mechanism in which both interpolation and scaling are involved. Interpolation works when each cell being interpolated has the same netlist. When an interpolated cell is actually built, the width of each transistor is set to the sum of the individual scale factors multiplied by the width of the corresponding transistor width in the original cells. The basic technique for interpolation assumes that the input capacitance is the sum of the input capacitances of each component cell multiplied by their respective scale factors. Interpolation also assumes that each component cell drives a portion of the total capacitance. For a given output timing characteristic, the output capacitance is set to the sum of the scaled output capacitances for each component cell for an equal value of that timing characteristic.

It is possible to use negative scaling factors in interpolation, in which case the timing behavior needs to be extrapolated from existing table values. For example, if a 2× inverter and a 4× inverter are scaled by −1.0 and 2.0 respectively, the result is effectively a 6× inverter (i.e., 2×−1.0+4×2.0=6.). Each transistor is now the linear extrapolation between the 2× and 4× cells. Note that the resulting cell is not necessarily the same as a 4× cell scaled by 1.5, because other electrical characteristics of the 2× and 4× cells, such as P/N ratios, may not be the same.

Step 320 represents one embodiment of the iterative optimization step of the present invention. Step 320 utilizes the real and virtual libraries, takes as input user configurations and terminates when a performance goal is reached, when it cannot find any improvements to make, or when a maximum number of changes is reached. A summary of the global variables input to the Optimize Design Step 320 is shown in the table below.

| Global Variable Input | Description |
| --- | --- |
| Libraries | Names of real and virtual libraries |
| Clocking Groups | Names of the clocking groups to optimize |
| Active Count | Number of groups to optimize simultaneously |
| Sequential Mode | Mode of operation for altering flip-flops and latches: |
| | none: don't make any changes |
| | replace: allow real cells but not virtual cells |
| | scale: allow virtual cells but not real cells |
| | both: allow both real and virtual cells |
| Granularity | Granularity of scaled library, including maximum scale |
| Max Drive Strength | Maximum drive strength that will be used |
| Max Cell Area | Maximum cell area that will be used |
| Real Cell Effort | Mode of operation of preferring real cells over virtual cells: |
| | low: don't prefer real cells over virtual cells |
| | medium: try real cells first a few times, then try virtual cells |
| | high: try all real cells first, then try virtual cells |
| | highest: try only real cells |
| Don't Touch | List of cells not to try to optimize |

The Libraries variable is the names of the real and virtual libraries. The Clocking Groups variable indicates to the optimizer which clocking groups should be optimized. The optimizer will analyze the worst case timing utilizing only the groups specified by this variable. Multiple clocking groups can be specified. The next variable, Active Count, is the number of clocking groups to optimize across simultaneously. The Sequential Mode variable is used to configure the optimizer with the preferred behavior for the treatment of sequential cells, i.e., cells that contain flip-flops or latches. The user can specify that sequential cells should be not optimized, that they should be optimized using only cells from either the real or virtual libraries, or that any cell replacement is acceptable.

The Granularity variable specifies the scaling steps to be used by the optimizer in the scaling phase. An example of scaling steps would be the following sequence: 100, 120, 140, 160, 180, 200, 220, 240, 260, 280, 300, 325, 350, 375, 400, 425, 450, 475, 500, 525, 550, 575, 600, where each number is a percentage of scaling over a base cell size. Note that additional cells beyond those specified in this variable can be placed in the virtual library. These cells will not be used during the scaling phase, but they will be utilized during the final phase of optimization where cells on the critical path are replaced with every equivalent cell in the virtual library. These phases are described in further detail below in conjunction with FIG. 5.

The Max Drive Strength and Max Cell Area variable are used to limit the scaling that can occur. The Real Cell Effort variable is used to configure the optimizer with the preferred behavior for the level of preference to real cells over virtual cells. In some cases, it is desirable to utilize real cells first. This will try to find solutions where the minimum number of virtual cells are used to achieve the desired performance. Use of real cells minimizes the amount of effort required to generate new cells once the optimizer is finished. If the Real Cell Effort variable is set to "low", there is no preference given to real cells over virtual cells. If the variable is set to "medium", then a given instance will be replaced with a real cell a certain number of times, if the performance increases, before virtual cells are utilized. In practice a reasonable number for this count is three. This count applies globally to a specific instance across the entire optimizer run. If the Real Cell Effort is set to "high," every cell in the real library will be tried for every cell on the critical path before virtual cells are utilized. Finally if the Real Cell Effort is set to "highest," only real cells will be tried. More details on the function and operation of the real library preference mode are provided below in conjunction with the description of FIGS. 5, 6 and 7.

The last global variable is the Don't Touch variable that contains a list of specific cell instances that should not be selected as candidates for replacement. This feature can be used to override the optimization process so that certain cells are not replaced even if they are on the critical path.

Optimizer step 320 of FIG. 3 also takes two command line parameters. These are the Maximum Nudge Count and the Slack Goal. The Maximum Nudge Count specifies a termination condition to limit the run time if the desired performance has not been reached but incremental improvements are still being found. The Slack Goal specifies a termination condition for when to terminate based on the worst case path. Default values for the Maximum Nudge Count and the Slack Goal are 1,000,000 and 0.0 ns respectively. The function of these termination conditions is described in more detail below in conjunction with FIG. 4.

Step 330 of FIG. 3 represents an optional clean-up phase where, after the optimizer has terminated, the overall design can be further improved. The first function is Recover Instances. Recover Instances processes a changes file, and for each instance in which a scaled version of a cell has been specified, the performance will be compared to every real cell to determine if there is no change in timing. If no change or a reduction in timing is achieved, the scaled cell is replaced with the real cell. In this way, the number of virtual cells utilized can be minimized. In an alternative embodiment, rather than looking only at the timing of each individual scaled cell, a scaled cell could be replaced by a real cell if the overall worst case delay doesn't change, even if this particular cell gets slower. In either case, the timing comparison can be given a tolerance value, so that small increases in timing are allowed.

Step 340 of FIG. 3 represents the step of generating ECO files to be used by synthesis tool 215 and placement tool 225. A previously generated file representing the changes to the design (i.e., which cell instances have been replaced with which library cells) is processed in this step and the ECO files are generated. Step 350 represents the step of generating real library cells for those cells that were selected by the optimizer. The ProGenesis product by Prolific, Inc. is an example of a product that can be used to automatically generate real cells from a scale specification. Finally, step 360 represents the operation of detailed routing 235 using the updated design and the updated library.

Figure 4:
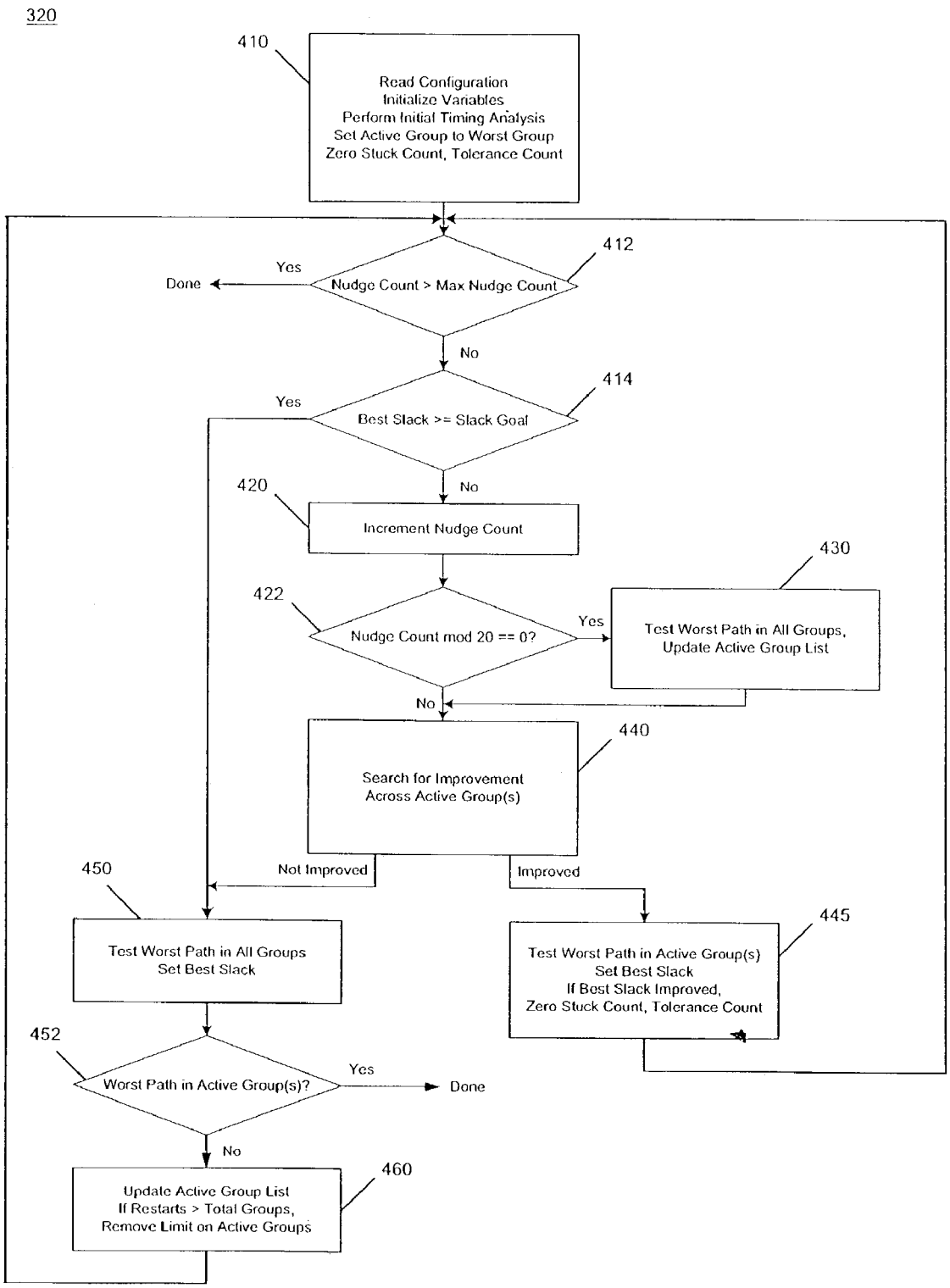
FIG. 4 illustrates a flow chart of an embodiment of an optimization function of the present invention.

FIG. 4 illustrates an embodiment of the optimizing step 320 shown in FIG. 3. The command line parameters Max Nudge Count and Slack Goal are passed as parameters to the algorithm shown in FIG. 4 and the global variables illustrated in Table 1 are also utilized. Step 410 is an initialization step in which various variables are initialized. An initial timing analysis is performed on the circuit design in step 410 and the worst timing path across all groups is determined. The active group is set to the worst group, the Best Slack variable is set to the timing slack through the critical path, and the Nudge Count, Stuck Counter and the Tolerance Counter are set to zero.

In step 412, the current Nudge Count is compared to the Max Nudge Count parameter and if the maximum count has been reached, the optimizer terminates. The Max Nudge Count parameter is not intended to control a normal termination condition, but to terminate in the event of infinite loops, and to allow the user to control the maximum running time of the optimizer. In step 414, the Best Slack variable is compared to the Slack Goal parameter and if the goal has been reached, control is transferred to step 450. The Slack Goal parameter allows the user to control the termination by governing how much improvement is desired. The optimizer will terminate only when all groups being optimized are better than the Slack Goal, as illustrated in more detail below.

If neither condition tested by steps 412 and 414 is true, control is transferred to step 420, in which the Nudge Count counter is incremented. In step 422, the incremented nudge count mod 20 is generated and if the result is equal to zero, control is transferred to step 430. This has the effect of executing step 430 every 20 times through the main loop consisting of steps 412, 414, 420, 422, 440 and 445. In step 430, the worst group across all optimized groups is measured, and if the currently active group is not the worst group, the new worst group is added to the active group list and if necessary, a group is removed from the active group list. As described above, the user may set the maximum number of active groups that will control how many groups are in the active list. The default value for this global variable is one, meaning that when the new worst group is added to the active list, the previous worst group is removed since only one group is allowed on the active list. The purpose of step 430 is to periodically test all groups being optimized, so that if improvements are made such that the worst group is no longer the group being optimized, optimization will shift to the new worst group. After step 430 executes control is transferred to step 440. In an alternative embodiment, an iteration count other than 20 could be used. It would be possible to execute step 430 more frequently (even every iteration), or less frequently. The choice of 20 was chosen to balance the overhead of analyzing all optimized groups and closely tracking the worst group.

Figure 5:
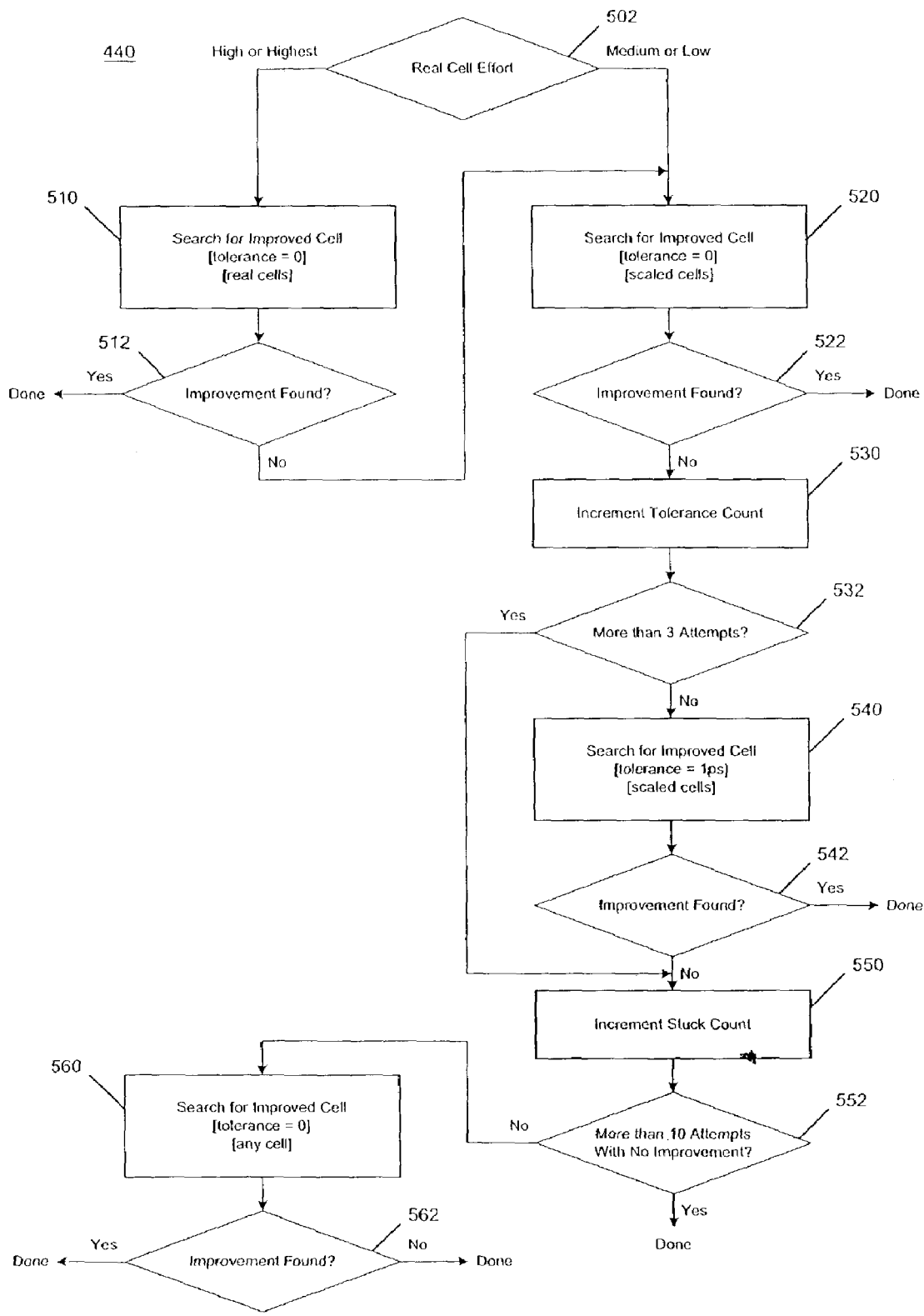
FIG. 5 illustrates a flow chart of an embodiment of a cell search function of the present invention.

Step 440 is the main optimization step where a single improvement, or nudge, is made to the circuit design. The result of step 440 is either that an improvement has been made, or that no improvement can be found. More detail of an embodiment of step 440 is illustrated in FIG. 5. In the case that an improvement was found, control is transferred to step 445. In step 445, the worst path in the currently active groups is measured and the Best Slack variable is updated if the slack of the worst path has improved. In the case of improvement, the Stuck Counter and the Tolerance Counter are also zeroed. The use of these counters is described below in conjunction with FIG. 5. After step 445, execution continues with step 412 described above. This completes the main optimization loop.

In the case that no improvement can be found in step 440, control continues with step 450, in which the circuit design is re-analyzed and the worst path across all optimized groups is determined. In step 452, a test is made to determine if the current worst group is in the active group list. If the result of this test confirms that the worst group is in the active group, execution of the optimizer terminates. The purpose of steps 450 and 452 is to ensure that the lack of improvement achievable from step 440 is not based on a path that is not the worst path. Since step 430 is called only every 20 iterations, it is possible that the worst group is not currently in the active group list.

In the case that the worst group is not in the active group, control is transferred to step 460, in which the worst group is added to the active group list. In the case that the number of times this "restart" condition has occurred is greater than the number of active groups, the limit on the number of active groups is also removed in this step. This prevents an infinite loop situation in which close paths in different groups continuously sequence between worst groups. At the end of step 460, control is transferred to step 412 and the main optimization loop is reentered.

FIG. 5 illustrates more detail of an embodiment of the optimization step 440 described above. This step involves a search for an improved design with a cell replacement. If an improvement is found, the step returns indicating "Improvement." If no improvement can be found, the step returns indicating "No Improvement." Decision block 502 tests whether the global variable Real Cell Preference is set to "high" or "highest." If the setting is "high" or "highest," control transfers to step 510, and otherwise control transfers to step 520. In step 510, a search for an improved cell is made with the restriction that only real cells are allowed, and with the tolerance parameter set to zero. More detail on an embodiment of step 510 is provided below in conjunction with FIG. 6.

If the result of step 510 is that an improved cell has been found, as tested in step 512, step 440 returns indicating "Improvement." Otherwise, control is transferred to step 520. Step 510 forces every real cell to be tested for a timing improvement before virtual cells are tried, and this step will only be utilized if the user has selected "high" or "highest" as the Real Cell Preference mode.

In Step 520, a search for an improved cell is made allowing virtual cells to be used and with the tolerance variable set to zero. More detail on an embodiment of step 520 is provided below in conjunction with FIG. 6. If the result of step 520 is that an improved cell has been found, as tested in step 522, step 440 returns indicating "Improvement." Otherwise, control is transferred to step 530.

In step 530, the Tolerance Count is incremented and in step 532, the incremented value is compared to three. If the result is more than three, control is transferred to step 550, otherwise control is transferred to step 540. The Tolerance Count and the maximum allowed value are used to allow the timing to decrease slightly for a few cell replacements so that if there is a local minimum, the optimizer will be able to get beyond the local minimum and proceed. Due to anomalies in the timing analysis, it is possible that there is no single cell that can be replaced to improve timing, but a larger number of cell replacements will improve timing. In alternative embodiments of step 440, the maximum tolerance count value of three can be another number, including zero, in which control would always be transferred to step 550. The user can override the default value of three with another value.

In step 540, a search for an improved cell is made allowing virtual cells to be used and with the tolerance variable set to one picosecond. The tolerance value passed as a parameter in this step can be set by the user to any value other than its default value of one picosecond. More detail on an embodiment of step 540 is provided below in conjunction with FIG. 6. If the result of step 540 is that an improved cell has been found, as tested in step 542, step 440 returns indicating "Improvement." Otherwise, control is transferred to step 550.

In step 550 the Stuck Count is incremented and in step 552, the incremented value is compared to 10. If the result is greater than 10, step 440 returns indicating No Improvement, otherwise control is transferred to step 560. The Stuck Count and the maximum value are used terminate if a certain number of cell improvements do not change the Best Slack. Recall that in step 445 the Tolerance Count and the Stuck Count were zeroed if the Best Slack had improved. In alternative embodiments, the maximum stuck count value of 10 can be another number. The user can override the default value of 10 with another value.

In step 560, a search for an improved cell is made using every cell in both real and virtual libraries and with the tolerance variable set to zero. More detail on an embodiment of step 560 is provided below in conjunction with FIG. 6. If the result of step 560 is that an improved cell has been found, step 440 returns indicating "Improvement," otherwise step 440 returns indicating "No Improvement."

Figure 6:
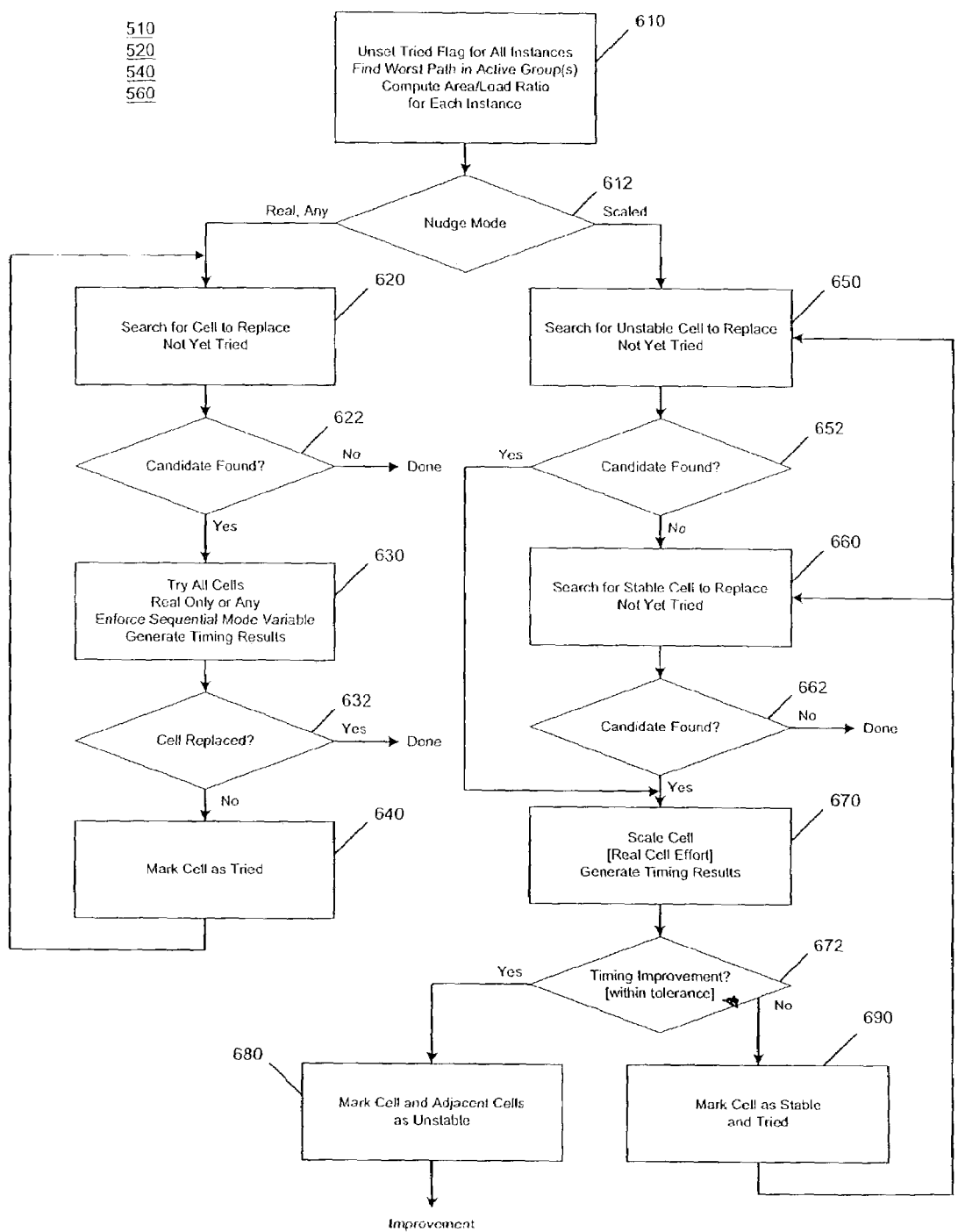
FIG. 6 illustrates a flow chart of an embodiment of a part of a cell search function of the present invention.

FIG. 6 illustrates more detail of an embodiment of steps 510, 520, 540 and 560 described above. In step 610, a number of initialization steps are performed to set up the search for an improved cell. First, an array indicating whether an instance has been tried is cleared. This has the effect of clearing this "Tried" flag for every instance in the design. Then the worst path in all active groups is determined and for all instances in this worst path, an area to transition time ratio is computed. This is an indication of how heavily loaded the cell is relative to its drive strength. The reason for computing this value for every cell instance in the critical path in step 610 is to control the order in which cells are tested for improvement. Cells with smaller area to, transition time ratios will be tested first to see if a replacement can improve timing. An advantage of ordering the replacements in this way is that the smallest and most heavily loaded cells get replaced first. These cells are the ones that are most likely to yield timing improvements with the minimal impact on overall power, area and impact to final placement and routing. In alternative embodiments, the control of the order in which replacements are attempted is based on a different computed variable. For example the ordering value could be based on a more complex function of power, area and/or transition time.

In step 612, the Nudge Mode is tested. In the case of "real" and "any," corresponding to steps 510 and 560 respectively, control is transferred to step 620. In the case of "virtual," corresponding to steps 520 and 540, control is transferred to step 650. In step 620, the cell with the lowest area to transition time ratio on the critical path that has not already been tried is determined. If no such cell exists, as determined by step 622, control is returned. If there is such a cell, control is transferred to step 630. Step 630 tries to find a better cell for a specific instance in the circuit design. Every logically equivalent cell will be tested for a timing improvement. In the case that the Nudge Mode is "real," only real cells will be tried, in the case that the Nudge Mode is "any", all logically equivalent cells in both libraries will be tried. If the instance passed to step 630 is not in the library or on the don't touch list, it will not be replaced. Also, if it is a sequential cell (i.e. a flip-flop or latch), the Sequential Mode global variable discussed above is enforced. Note that in the case that the Nudge Mode is set to "any," all logically equivalent cells in the virtual library will be tested, even if they are not cells that within the cell scale, specified by the Granularity global variable.

Step 630 returns an indication of whether a cell replacement was actually made, which is tested in step 632. If a cell replacement was made, control is returned. Otherwise, control is transferred to step 640. In step 640, the instance that was not replaced is marked as being tried and control is transferred to step 620. The loop consisting of steps 620, 622, 630, 632 and 640 represents an iterative process in which all instances on the critical path are tested for a replacement cell that improves timing. The process terminates when a timing improvement is found or when there are no more instances that have not been tried.

There is an analogous loop for the case where scaled cells are used that starts with step 650. A cell instance is considered "stable" if an attempt has been made to scale it, and for which no scaled cell has been found that improves timing. Once a cell has been marked as stable, it will not be tested again until its context changes. An instance's context changes when any cell it is driven by, or any cell it drives, is changed. All instances start out marked unstable. In step 650, the cell with the smallest area to transition time ratio that has not been tried and is marked unstable is determined. If no such cell exists, as determined by step 652, control is transferred to step 660. If there is such a cell, control is transferred to step 670. In step 660, the cell with the smallest area to transition time ratio that has not been tried and is marked stable is determined. If no such cell exists, as determined by step 662, control is returned. This will happen when a scaling attempt has been made for every cell in the critical path.

In step 670, an attempt is made to scale the instance determined to be the best candidate. There are two modes of operation for step 670, corresponding to the "low" and "medium" settings of the global variable Real Cell Effort described above. More detail on an embodiment of step 670 is provided below in conjunction with FIG. 7. Step 670 returns an indication of whether a cell replacement was actually made, which is tested in step 672. If a replacement was made, control is transferred to step 680, otherwise control is transferred to step 690. In step 680, the cell that was replaced is marked as unstable along with all of the cells that drive it, and that it drives. Control is then returned. In step 690, the cell that was unsuccessfully attempted to be scaled is marked as stable and tried, and control is transferred to step 650. The loop consisting of steps 650, 652, 660, 662, 670, 672 and 690 represents an iterative process in which an attempt is made to scale all instances on the critical path. The unstable instances are tried first, and if none of them yield improvements, then the other instances are tried.

Figure 7:
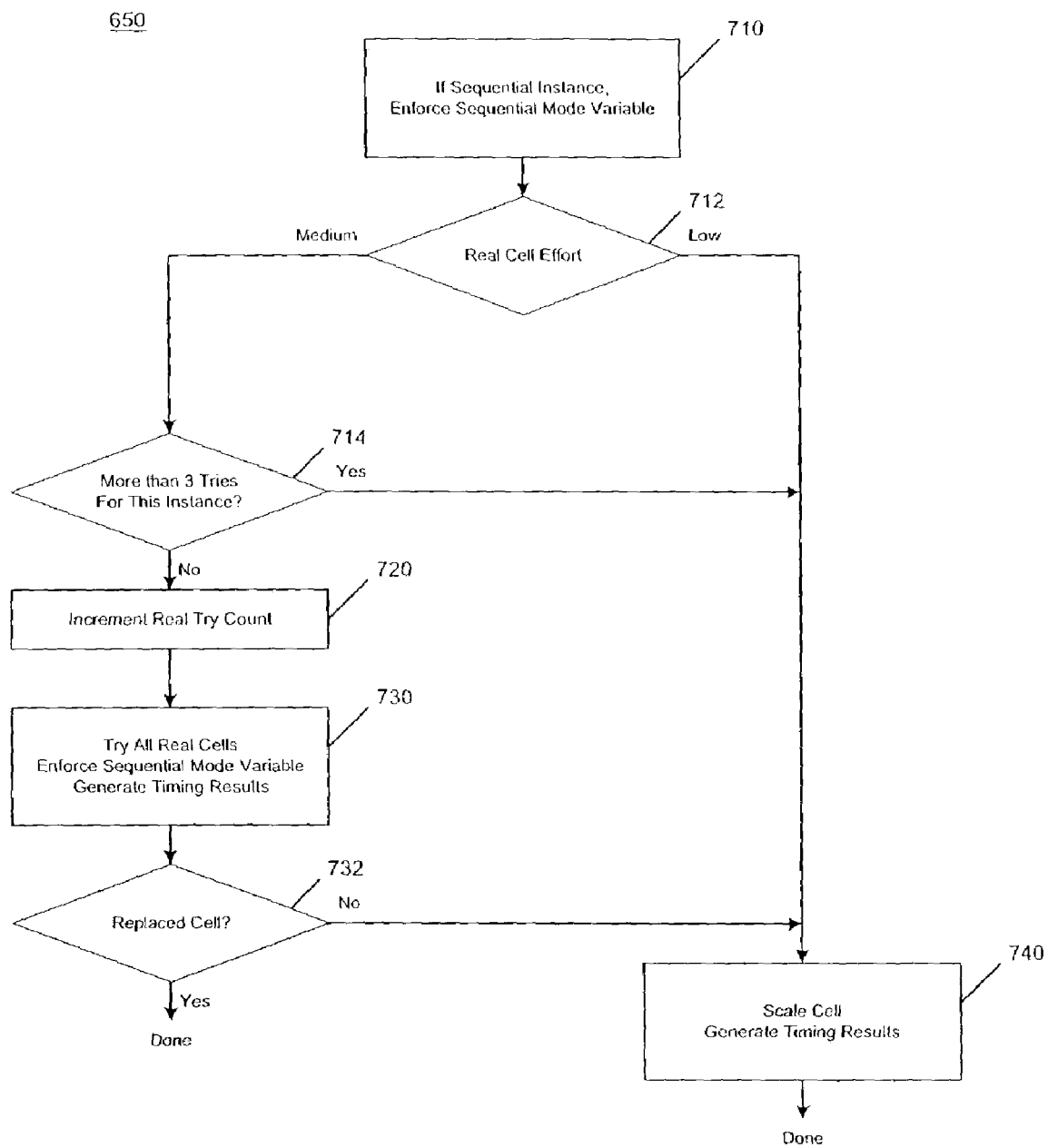
FIG. 7 illustrates a flow chart of an embodiment of a cell scale function of the present invention.

FIG. 7 illustrates more detail of an embodiment of step 650 described above. Step 710 ensures that if the instance passed to step 650 is not in the library or on the Don't Touch list, it will not be scaled. Also, if it is a sequential cell (i.e. a flip-flop or latch), the Sequential Mode global variable discussed above is enforced. The Real Cell Effort mode is tested in step 712. In the case of "medium," effort, a global counter for the specific instance, the Real Try Count, is tested for being greater than three. If the number of times this instance has been tried with real cells is less than three, control is transferred to step 720, otherwise control is transferred to step 740. Step 720 increments the Real Try Count for this instance and control continues with step 730. The Real Try Count implements the "medium" mode of the Real Cell Effort global variable, in which real cells are tried a certain number of times before virtual cells are tried. In alternative embodiments, the number of times to try real cells before utilizing virtual cells can be another number.

Step 730 tries to find a better cell for the instance by testing every logically equivalent cell in the real library. Step 730 is substantially the same as step 630 described above in the case of FIG. 6 corresponding to step 510. In the case that step 730 returns without having found a better cell, as tested by step 732, control is transferred to step 740, otherwise control is returned. In step 740, the given instance is scaled by one step in the scale as specified by the Granularity global variable and timing results for the circuit design with the scaled cell are generated.

Figure 8:
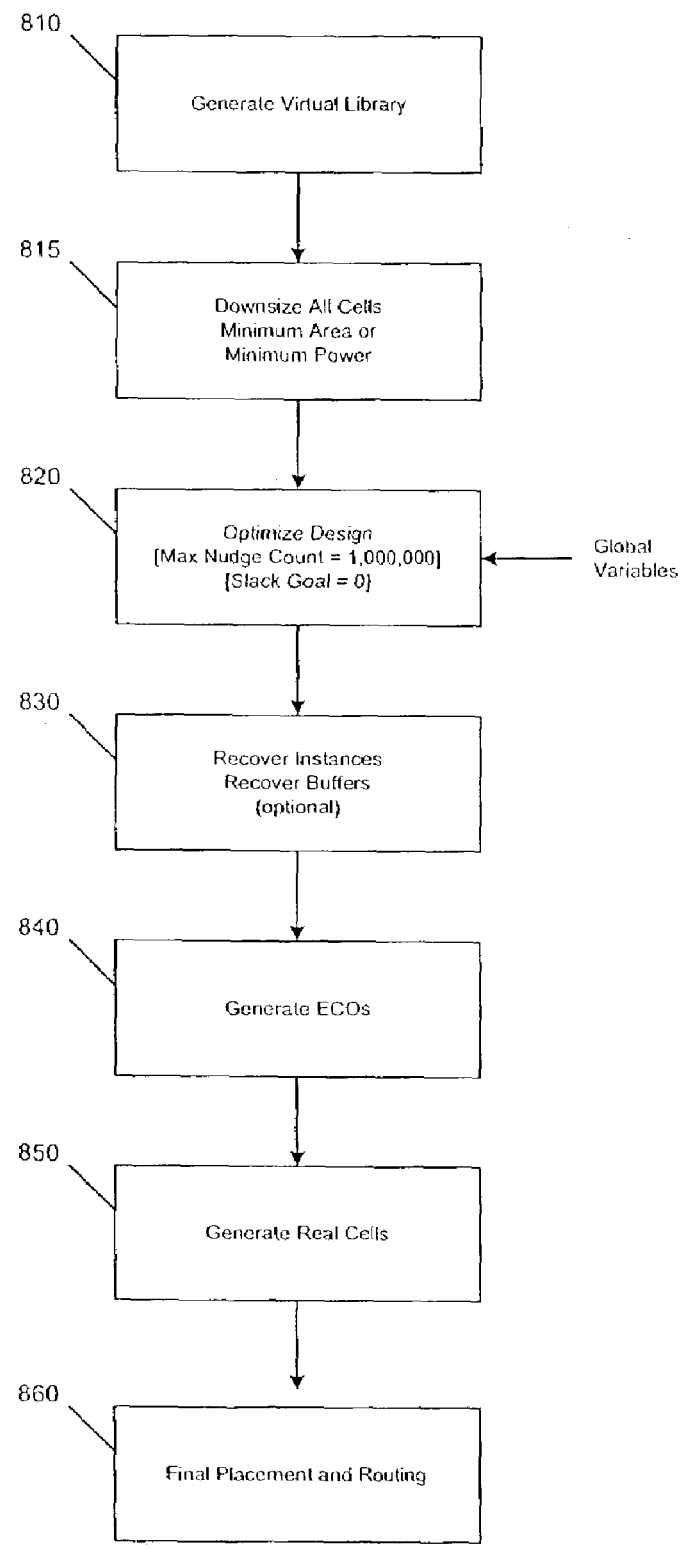
FIG. 8 illustrates a flow chart of an alternative embodiment of the present invention.

FIG. 8 represents an alternative embodiment of the present invention in which power or area are optimized rather than timing. Steps 810, 820, 830, 840, 850 and 860 operate in substantially the same way as the analogous steps in FIG. 3. Step 815 has been added in which previous to the operation of the Optimization step 820, all instances in the design are lowered to their minimum area or minimum power. The optimizer will then increase the sizes of the cells as necessary to meet the timing goal. The result is that only the cells that are required to be increased in power or area to meet timing will be, resulting in a design of optimal power or area.

An alternative embodiment would be to allow cell instances to be decreased in size during the optimization process. One way to implement such an embodiment would be to sort the cells in the reverse order during a step corresponding to step 610 described above. Instead of starting with the cells with the smallest area and largest transition time, the cells with the largest area and shortest transition time would be selected first. Then for each candidate cell selected, the smallest or lowest power cell would be found that keeps the slack of that cell greater than the worst slack plus a guard factor. If such a replacement cell exists, the replacement would be performed, the timing information would be updated and the sequence would repeat, in much the same manner described above. The reason for the guard factor, which could be set to zero in alternative embodiments, is to guarantee that new critical paths are not introduced. The path being impacted by the cell replacement will still be at least the guard factor faster than the critical path.

It will be appreciated by one skilled in the art that in alternative embodiments, many of the steps can be performed independently and in parallel rather than in sequence. An advantage of parallel operation is that with sufficient computing resources the total running time of the optimization is reduced. In particular, steps 630 and 730 described above involve generating timing results for an entire group of cells in the real and virtual cell libraries. By allowing multiple instances of the static timing analysis tool to run independently on separate copies of the circuit design, these steps can be parallelized. It is also the case that steps 670 and 740 described above, rather than evaluating a single step in the scaling of the candidate cell could evaluate multiple scalings of the candidate cell in parallel. In will be appreciated that other aspects of the current invention can be parallelized.

One skilled in the art will appreciate that the present invention can be practiced by other than the described embodiments, which are presented for purpose of illustration and not of limitation.

The invention claimed is:

1. A method of optimizing a circuit design having a plurality of cells, comprising the steps of:
   (a) providing a plurality of logically equivalent cells that vary in a design parameter, said plurality of logically equivalent cells having a relatively continuous spectrum of values of said design parameter, wherein said plurality of logically equivalent cells comprise at least one real cell and a plurality of virtual cells, wherein said virtual cells include timing characteristics derived from said at least one real cell;
   (b) evaluating a selected characteristic of the circuit design; and
   (c) replacing a cell in the circuit design with a cell provided in said step (a).

2. The method according to claim 1, further comprising the steps of:
   (d) evaluating the selected characteristic of the circuit design after said step (c);
   (e) determining whether to retain the replacement made in said step (c); and
   (f) repeating said steps (c), (d) and (e) until a condition is met.

3. The method according to claim 2, wherein said step (e) comprises determining whether to retain the replacement made in said step (c) using the worst case delay of the circuit design.

4. The method according to claim 2, wherein:
   said step (b) further comprises selecting a timing path in the circuit design; and
   said step (c) comprises the sub-steps of (1) identifying cells in the selected timing path that are candidates for replacement, (2) determining a selected characteristic of cells in the selected timing path that are candidates for replacement, and (3) selecting a cell in the selected timing path for replacement using the selected characteristic determined in said step (c)(2).

5. The method according to claim 4, wherein said sub-step (c)(2) comprises determining the area to transition time ratio of cells in the selected timing path that are candidates for replacement, and said sub-step (c)(3) comprises selecting a cell in the selected timing path for replacement using the area to transition time ratio determined in said step (c)(2).

6. The method according to claim 4, further comprising the step of:

(h) marking a cell if the cell has been replaced in said step (c) and the replacement was not retained in said step (e);

and wherein step (c)(1) eliminates as possible candidates for replacement cells that are marked.

7. The method according to claim 6, further comprising the step of:
(i) unmarking a cell if the cell or an adjacent cell has been replaced in said step (c) and the replacement was retained in said step (e).

8. The method according to claim 4, wherein said step (f) comprises repeating said steps (c), (d) and (e) until all there are no candidates for replacement in the selected timing path.

9. The method according to claim 1, wherein said step (a) comprises providing a plurality of logically equivalent cells that vary in drive strength, the plurality of logically equivalent cells having a relatively continuous spectrum of values of drive strength.

10. The method according to claim 1, wherein said step (a) comprises providing a plurality of logically equivalent cells including real cell and virtual cells.

11. The method according to claim 1, wherein said step (b) comprises evaluating at least one of the characteristics selected from the following group: timing, area and power consumption.

12. The method according to claim 1, further comprising the step of:
(g) replacing a selected cell in the circuit design with a logically equivalent cell having the smallest area, after said step (a) and prior to said step (b).

13. The method according to claim 1, further comprising the step of:
(g) replacing a selected cell in the circuit design with a logically equivalent cell having the smallest power consumption, after said step (a) and prior to said step (b).

14. The method according to claim 10, wherein each said virtual cell is interpolated from at least two real cells utilizing a scale factor applied to each real cell.

15. The method according to claim 14, wherein said scale factors are positive integers.

16. A method of optimizing a circuit design having a plurality of cells, comprising the steps of:
(a) providing at least one set of cells, each set including a plurality of logically equivalent cells, including at least one real cell and virtual cells, that vary in a design parameter, and each plurality of logically equivalent cells having a relatively continuous spectrum of values of the design parameter, wherein said virtual cells include timing characteristics derived from said at least one real cell;
(b) evaluating a timing characteristic of the circuit design;
(c) selecting a worst case timing path in the circuit design; and
(d) replacing a cell in the selected timing path with a cell provided in said step (a).

17. The method according to claim 16, further comprising the steps of:
(e) evaluating the delay of the selected timing path after said step (d);
(f) determining whether to retain the replacement made in said step (d); and
(g) repeating one or more instances of said steps (d), (e) and (f) independently, until a first condition is met.

18. The method according to claim 17, further comprising the steps of:

(h) repeating step (c); and
(i) repeating steps (g) and (h) until a second condition is met.

19. The method according to claim 16, wherein step (d) comprises selecting a cell provided in step (a) based on a preference for real cells over virtual cells.

20. The method according to claim 16, wherein each said virtual cell is interpolated from at least two real cells utilizing a scale factor applied to each real cell.

21. The method according to claim 20, wherein said scale factors are positive integers.

22. A method of optimizing a circuit design having a plurality of cells, comprising the steps of:
(a) providing at least one set of cells, each set including a plurality of logically equivalent cells, including at least one real cell and virtual cells, that vary in a design parameter, and each plurality of logically equivalent cells having a relatively continuous spectrum of values of the design parameter, wherein said virtual cells include timing characteristics derived from said at least one real cell;
(b) evaluating a timing characteristic of the circuit design;
(c) selecting a worst case timing path in the circuit design;
(d) replacing a cell in the selected timing path with a cell provided in said step (a) having an incremental increase in drive strength;
(e) evaluating the delay of the selected timing path after said step (d);
(f) determining whether to retain the replacement made in said step (d);
(g) repeating said steps (d), (e) and (f) until a first condition is met;
(h) replacing a cell in the selected timing path with a cell provided in said step (a);
(i) evaluating the delay of the selected timing path after said step (h);
(j) determining whether to retain the replacement made in said step (h); and
(k) repeating said steps (h), (i) and (j) until a second condition is met.

23. The method according to claim 22, further comprising the steps of:
(l) repeating step (c); and
(m) repeating steps (g), (k) and (l) until a third condition is met.

24. The method according to claim 22, wherein each said virtual cell is interpolated from at least two real cells utilizing a scale factor applied to each real cell.

25. The method according to claim 24, wherein said scale factors are positive integers.

26. A method of creating a virtual library, comprising the steps of:
(a) providing a real library including timing characteristics of one or more cells;
(b) providing a virtual library by computing timing characteristics of a plurality of virtual cells that are logically equivalent to a cell in the real library, wherein said timing characteristics of said virtual cells are derived from said timing characteristics in said real library; and
wherein said real library and said virtual library comprise a plurality of logically equivalent cells that vary in a design parameter, said plurality of logically equivalent cells having a relatively continuous spectrum of values of said design parameter.

27. The method of claim 26 wherein said step (b) comprises the sub-steps of:

(b)(1) multiplying the input capacitance of a real cell by a scale factor to determine the input capacitance of said virtual cell; and (b)(2) multiplying the output capacitance associated with a timing characteristic of a real cell by the scale factor to determine the output capacitance associated with a timing characteristic of said virtual cell.

28. The method of claim 27 wherein said steps (b)(1) and (b)(2) are repeated a plurality of times for a plurality of input and output conditions.

29. The method of claim 28 wherein said plurality of input and output conditions include a specified input transition time.

30. The method of claim 28 wherein said plurality of input and output conditions include a specified output capacitance.

31. The method of claim 26 wherein said step (b) comprises the sub-steps of:

(b)(1) multiplying the input capacitance of a first real cell by a first scale factor;

(b)(2) multiplying the input capacitance of a second real cell by a second scale factor;

(b)(3) adding the results of said steps (b)(1) and (b)(2) to determine the input capacitance of said virtual cell;

(b)(4) multiplying the output capacitance associated with a timing characteristic of said first real cell by the first scale factor;

(b)(5) multiplying the output capacitance associated with a timing characteristic of said second real cell by the second scale factor; and (b)(6) adding the results of said steps (b)(4) and (b)(5) to determine the output capacitance associated with a timing characteristic of said virtual cell.

32. The method of claim 31 wherein said first scale factor is an integer and said second scale factor is an integer.

33. The method of claim 31 wherein said first scale factor is a positive integer and said second scale factor is a positive integer.

34. The method of claim 31 wherein said steps (b)(1) through (b)(6) are repeated a plurality of times for a plurality of input and output conditions.

35. The method of claim 34 wherein said plurality of input and output conditions include a specified input transition time.

36. The method of claim 34 wherein said plurality of input and output conditions include a specified output capacitance.

37. The method of claim 26 wherein said timing characteristics of said virtual cell include delay.

38. The method of claim 26 wherein said timing characteristics of said virtual cell include output transition time.

* * * * *